United States Patent [19]

Heft et al.

[11] Patent Number: 4,840,474

[45] Date of Patent: Jun. 20, 1989

[54] FURNACE VIEWING SYSTEM

[76] Inventors: Dallas E. Heft, 130 Chippewa Dr., Lancaster, Ohio 43130; Donald A. Carignan, P.O. Box 381, Westfield, Mass. 01086

[21] Appl. No.: 69,343

[22] Filed: Jul. 2, 1987

[51] Int. Cl.⁴ ............................................. G02B 15/10
[52] U.S. Cl. ................................... 350/572; 350/449; 356/43; 358/100
[58] Field of Search ............... 350/449, 454, 457, 565, 350/566, 572; 358/100, 108; 356/43, 44, 241

[56] References Cited

U.S. PATENT DOCUMENTS

| | | | |
|---|---|---|---|
| 3,021,385 | 2/1962 | Summerhayes, Jr. et al. | 358/100 |
| 3,021,386 | 2/1962 | Clark | 358/100 |
| 3,609,236 | 9/1971 | Heilman | 358/100 |
| 4,432,286 | 2/1984 | Witte | 358/100 |
| 4,496,218 | 1/1985 | Woods | 350/449 |
| 4,501,477 | 2/1985 | Sunaga | 350/572 |
| 4,539,588 | 9/1985 | Ariessohn et al. | 358/100 |
| 4,558,927 | 12/1985 | Omori et al. | 350/449 |
| 4,695,881 | 9/1987 | Kennedy et al. | 358/100 |

Primary Examiner—John K. Corbin
Assistant Examiner—Martin Lerner
Attorney, Agent, or Firm—Biebel, French & Nauman

[57] ABSTRACT

An optical adapter is installed between a standard lens tube and a television camera for inverting the image and for providing focus and intensity control. The adapter is provided with fittings which mate with both the standard lens tube and the camera. The adapter permits one set of lens tubes to be used with both Vidicon black and white television camera systems and solid-state color television camera systems. A motor mounted on the adapter and controlled by the camera controls an iris, thus permitting automatic intensity control.

3 Claims, 3 Drawing Sheets

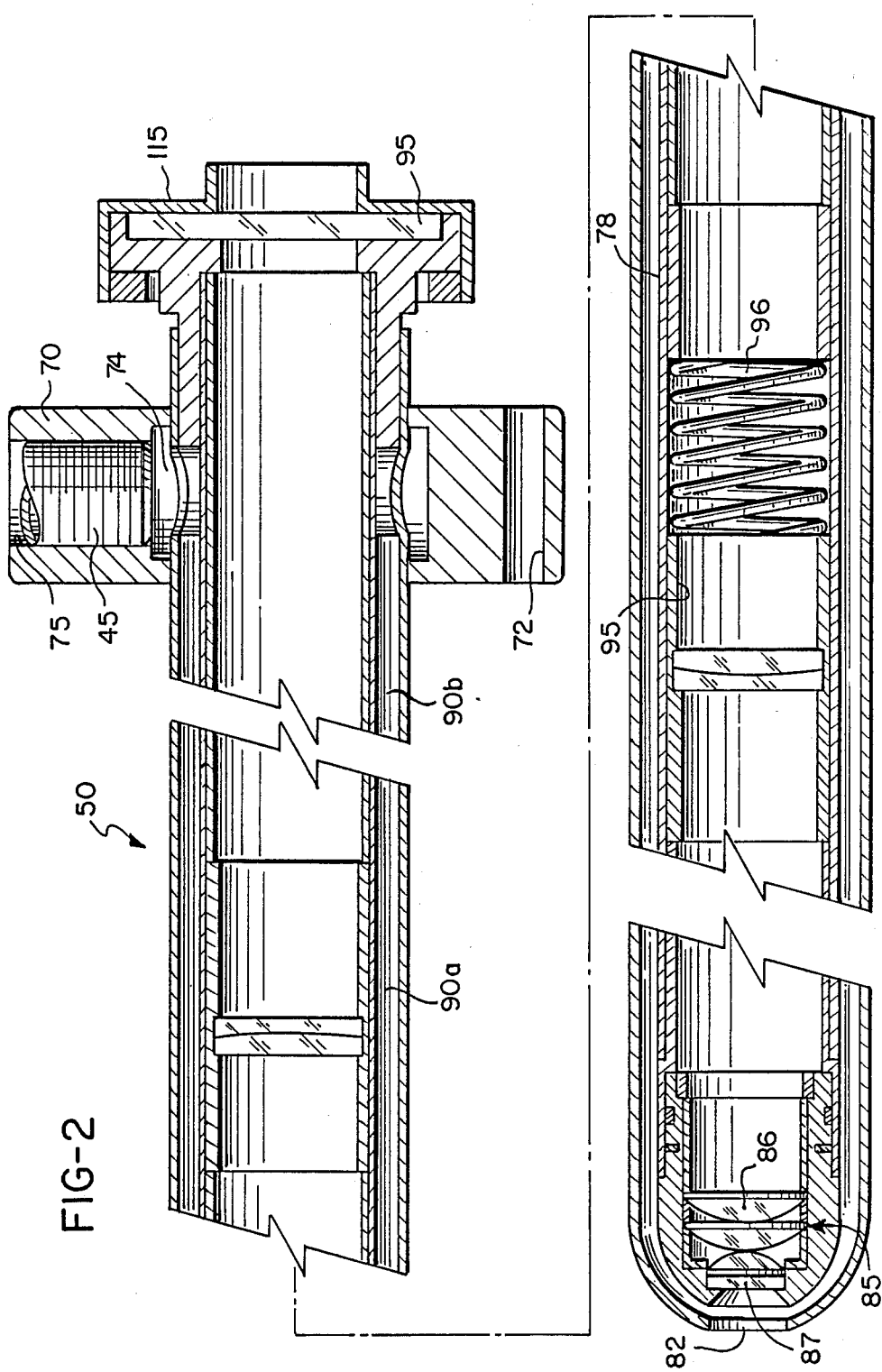

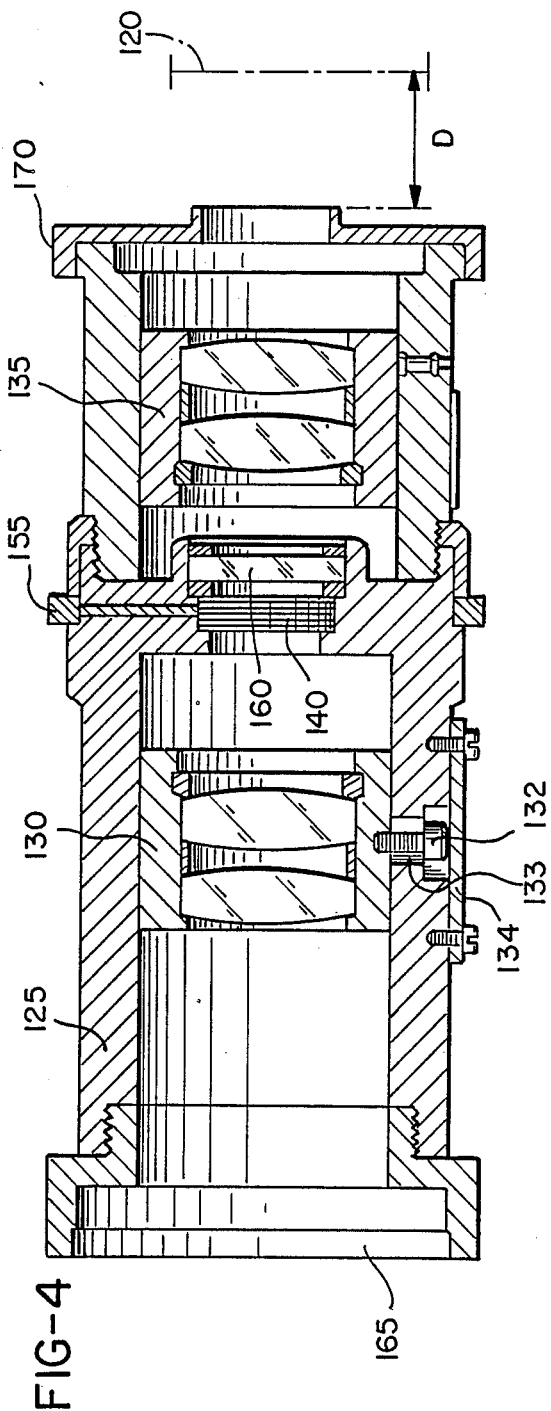
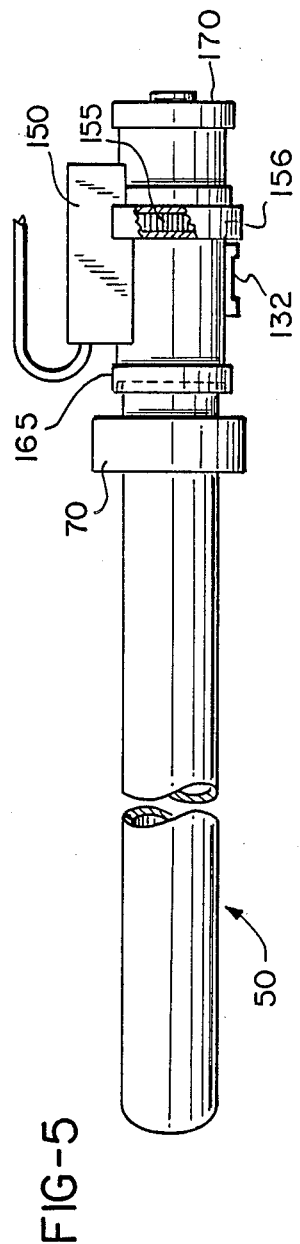
FIG-4
FIG-5

FURNACE VIEWING SYSTEM

BACKGROUND OF THE INVENTION

This invention relates to a furnace viewing system, and particularly to an adapter which permits the use of a series of standard lens tubes with a variety of cameras, both black and white and color, vacuum tube and solid-state.

In a typical furnace viewing system, a commercially available wall box is installed in the wall of the furnace with its lens tube housing pointed toward the area to be viewed. For example, it may be desired to monitor the igniters and light-off, enabling continuous checking of flame patterns and verifications that all burners are operational. Monitoring can prevent damage to a boiler due to improper combustion, or downtime and maintenance due to a flame out. In some cases, the camera may be viewing a kiln or a molten pool of metal or glass.

If the furnace has a positive pressure with respect to ambient, the wall box is provided with a source of air to prevent the gases in the furnace from escaping through this opening. A lens tube is installed in and secured to the wall box, and attached to the lens tube is a camera contained within a housing designed to maintain the temperature of the camera within specified limits. The lens tube itself is also provided with means for maintaining the lens tube elements cool relative to the furnace.

In a typical installation, the lens tube is designed to image the interior of the furnace approximately one inch behind the end of the lens tube at a position where the light-sensitive element of the camera is located.

In a typical prior art black and white camera, the imaging element is a Vidicon tube. Usually, the tube is provided with means to provide for focus control. A Vidicon has a large dynamic range; it is not normally necessary to provide any variable physical control of the intensity of the light applied to the tube since that can be handled electronically once a proper fitter is selected. Also, the image formed by the lens tube is non-inverted, but this is not a problem with a Vidicon type tube since it would only be necessary to reverse the leads controlling the electronic scan of the target to provide the proper output to the monitor.

The use of color cameras allows the operator to view the flames in the furnace bed in their natural color, and quickly to observe any changes that might be occuring. However, present-day solid-state color cameras have a limited dynamic range, thus requiring an iris within the lens system to control the intensity of the light applied to the target, and most do not have any mechanism for controlling focus. Furthermore, the target is scanned electronically, and it is difficult without extensive modifications and redesign, electronically to invert the image that would normally be available from a standard or conventional lens tube.

One prior art attempt to correct the intensity, focus and image orientation problem resulted in the extensive redesign of the lens tube to add an iris for intensity control and additional lenses for inverting the image. This solution to the problem, however, was found to be unacceptable since it required the stocking of additional lens tube systems for use with color cameras. This results in a substantial increase in the cost of inventory for the modification of existing systems to color monitors.

SUMMARY OF THE INVENTION

This invention relates to an adapter device to be installed between a standard lens tube and a solid-state camera system. The adapter device includes focus control, an iris, and the means to invert the image so that no further electrical modifications to the camera are required.

The use of the adapter device eliminates the need to inventory two different lens tubes, and permits the retrofitting of existing systems to provide color monitoring, thereby reducing the cost to the customer both in terms of the purchase of new lenses and any inconvenience that results in shutting down the furnace in order to install a new lens tube.

It is an object of this invention to provide, in a furnace viewing system comprising a television camera, a lens tube, means for installing the lens tube through the wall of the furnace, and means for cooling the lens tube and camera, the improvement comprising adapter means installed between the lens tube and the camera, said adapter means comprising a housing lens means for inverting the image produced by the lens tube at the end thereof, said lens means including a first lens cell system and a second lens cell system for focusing said inverted image at an image plane placed a predetermined distance from the end of the adapter housing, iris means between said first and said second lens systems for controlling the amount of light passing therethough, a motor connected to control said iris means, and focus control means for adjusting the location of said image relative to the active element in said camera.

Other objects and advantages of the invention will be apparent from the following description, the accompanying drawings and the appended claims.

BRIEF DESCRIPTION OF THE DRAWING

FIG. 2 is a cross-sectional elevational view of a typical standard lens tube assembly.

FIG. 4 is a cross-sectional elevational view of an adapter assembly constructed according to this invention.

FIG. 5 is an elevational view of a lens tube with adapter attached.

DESCRIPTION OF THE PREFERRED EMBODIMENT

Figure 1:
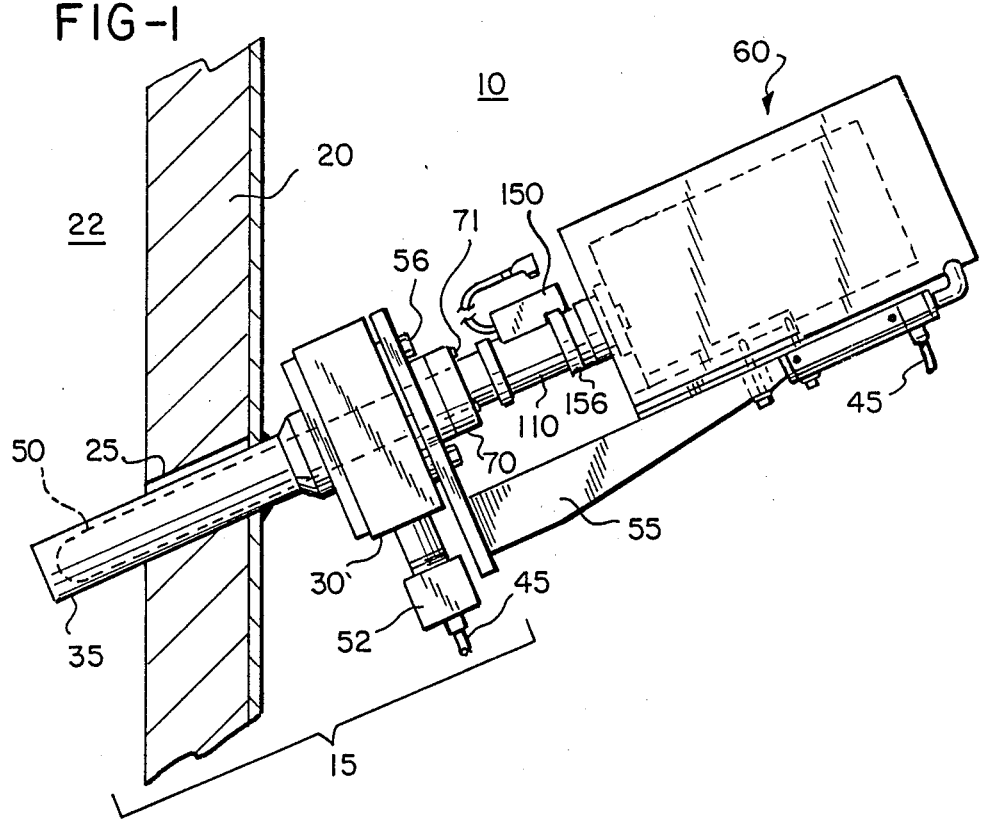
FIG. 1 is an elevational view showing the installation of a typical furnace viewing system.

Referring now to the drawings which show a preferred embodiment of this invention, and particularly to FIG. 1, a furnace viewing system shown generally at 10 includes a conventional wall box assembly 15 installed in the wall 20 of a furnace 22. While not part of the present invention, it should be noted that the furnace wall 20 may be provided with means for cooling it, such as cooling pipes. The wall box is installed in an opening 25 formed in the furnace wall and so oriented that the preferred portion of the furnace is being viewed. The wall box assembly 15 includes a plenum chamber 30 and a cylindrical tube 35 which extends through the furnace wall. Typically, the wall box tube is welded to the furnace wall at 40.

If the interior of the furnace has a positive pressure with respect to ambient, compressed air will be introduced into the plenum chamber through air supply line 45 where the air will flow through the wall box tube 35 and into the furnace, thus preventing hot gases from the interior of the furnace from blowing back through the wall box and toward the operator. Once a lens tube assembly 50 is installed in the wall box, the amount of air pressure may be reduced considerably by valve 52.

A bracket 55, attached to the wall box assembly by bolts 56, supports a camera unit 60, including a high temperature housing 62 and a camera 65. Means are provided to cool the camera and to maintain it with its operating temperature limits.

The lens tube assembly 50, shown in detail in FIG. 2, includes a flange 70 for mounting the assembly to the wall box by means of three mounting bolts 71 that extend through holes 72. This flange also contains a hollow plenum 74 into which air may be introduced at 75 from air source 45 to be flowed into a chamber 76 formed between an inner 78 and outer 80 casings of the lens tube assembly. This air maintains the internal components of the lens tube cool and prevents their destruction by the heat of the furnace. This cooling air exits the lens tube assembly into the furnace through an opening 82 at the end thereof.

Figure 3:
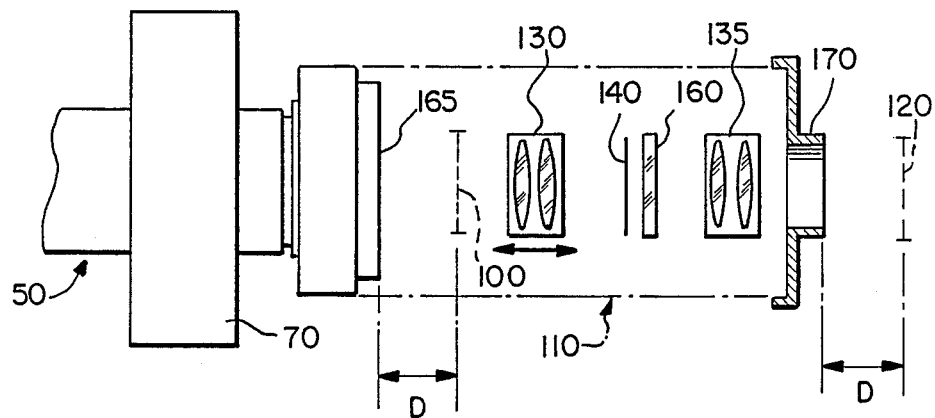
FIG. 3 is a pictorial view illustrating the operation of the adapter assembly.

A typical lens tube assembly includes an objective lens cell 85, a relay lens 90 (including elements 90a and 90b), and perhaps a filter 92. A plurality of spacers 95 and a spring 96 maintain the lens elements in place. The objective lens cell 85 includes several lens elements 86 and a quartz window 87. An image of the viewed area is formed at the image plane 100 (FIG. 3), a distance D (approximately 1 inch) behind the end cap 115; this is where the active element of the television camera is normally placed. As previously explained, this image is neither inverted nor reversed, and although that poses no significant problem to the older style Vidicon type camera tubes, it is difficult to invert this image as required by solid-state imaging devices.

An adapter assembly 110 is installed on the end of the standard lens tube in place of lens tube cap 115 (FIG. 2) and focuses the image of the furnace interior at the new image plane 120 (FIG. 4), the distance behind the end thereof, at the location where the active element of the camera will be located. This image will be inverted and thus correct, requiring no modification of the camera assembly itself.

The adapter assembly 110 includes an outer housing 125 containing a pair of lens cell 130 and 135, with lens cell 130 being movable along the axis of the adapter assembly 110 to provide for focus control. As shown in FIG. 4, this adjustment is made possible by the screw 132 which, when loosened, may slide in slot 133. After properly set, the screw and opening are protected by plate 134.

An iris assembly 140 is placed between lens cells 130 and 135. The iris is controlled by a motor 150 (FIGS. 1 and 5) which interacts with a ring gear 155 placed in a slot which completely surrounds the adapter assembly. The ring gear is protected by a housing 156 (FIG. 5). The motor 150 is under the control of electronic circuitry associated with the camera to control the amount of light which passes through the adapter assembly since solid-state cameras do not have a large dynamic range. A filter 160 may be included with the iris further to control the amount of light passing through to the camera. In some cases, it may be desirable to have a variable density filter at this location.

The adapter assembly is provided with a fitting 165 at one end which mates with the standard lens tube, and an end cap 170 at the other end which matches the lens mounting hardware of camera 65.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a furnace viewing system, an adapter device for installation between a conventional lens tube and a conventional television camera comprising
    iris control means for controlling the amount of light passing through the lens tube,
    lens means for inverting the image passing through the lens tube, and
    focus control means for adjusting the spacing between the camera and said lens means.

2. A furnace viewing system comprising a television camera, a lens tube, means for installing the lens tube through the wall of the furnace, and means for cooling the lens tube and camera,
    adapter means installed between the lens tube and the camera, said adapter means comprising
    a lens means for inverting the image produced by the lens tube at the end thereof, said lens means including a first lens cell system and a second lens cell system for focusing said inverted image at an image plane placed a predetermined distance from the end of the adapter housing,
    iris means between said first and said second lens systems for controlling the amount of light passing therethrough,
    a motor connected to control said iris means, and
    focus control means for adjusting the location of said image relative to the active element in said camera.

3. In a furnace viewing system comprising a television camera, a lens tube, means for installing the lens tube through the wall of the furnace, and means for cooling the lens tube and camera,
    adapter means installed between the lens tube and the camera, said adapter means comprising
    a housing including a first fitting for connecting said housing to the lens tube and a second fitting for connecting said housing to the camera,
    lens means for inverting the image produced by the lens tube at the end thereof, said lens means including a first lens cell and a second lens cell,
    iris means between said first and said second lens systems for controlling the amount of light passing therethrough, and
    a motor connected to control said iris means.

* * * * *